United States Patent [19]
Kobayashi et al.

[11] 3,890,864
[45] June 24, 1975

[54] MESHES CUTTING MACHINE

[75] Inventors: Yasunobu Kobayashi, Osaka;
Hikaru Ogawa, Kobe, both of Japan

[73] Assignee: Kobe Steel, Ltd., Kobe, Japan

[22] Filed: June 5, 1974

[21] Appl. No.: 476,534

[30] Foreign Application Priority Data
June 5, 1973    Japan................................ 48-64259

[52] U.S. Cl. ..................... 83/162; 83/105; 83/165;
83/327; 83/423; 83/440.1
[51] Int. Cl. ...................... B23d 15/04; B23d 33/02
[58] Field of Search ............ 83/162, 105, 165, 327,
83/423, 435.2, 440.1, 440, 278

[56] References Cited
UNITED STATES PATENTS
| | | | |
|---|---|---|---|
| 3,595,115 | 7/1971 | Pelletier.......................... | 83/440.1 X |
| 3,601,166 | 8/1971 | Kohler............................. | 83/423 X |
| 3,722,343 | 3/1973 | Cornell............................. | 83/423 X |

*Primary Examiner*—Frank T. Yost
*Attorney, Agent, or Firm*—Oblon, Fisher, Spivak, McClelland & Maier

[57] ABSTRACT

A meshes cutting machine for permitting the continuous cutting of a length of meshes which are being moved or advanced continuously rather than intermittently. The meshes cutting machine includes a pair of cooperating cutting edges placed in a vertical direction, with the upper cutting edge being stationary and the lower cutting edge being adapted to move vertically to cut the widthwise members of the meshes; a guide groove adapted to guide the meshes which are cut continuously; and a drive pawl mechanism adapted to drive the meshes forward and, at the same time, to position the lengthwise member composed along the advancing direction of the meshes at a desired spacing from the cutting line of the meshes maintaining parallelism with the aforesaid cutting line and with the advancing direction. This drive pawl mechanism may shift in a direction perpendicular to the cutting line by means of a screw mechanism to change the aforesaid spacing of the lengthwise members of the meshes from the cutting edges.

8 Claims, 4 Drawing Figures

MESHES CUTTING MACHINE

BACKGROUND OF THE INVENTION

1. Field of the Invention

The present invention relates to a meshes cutting machine and more particularly to a meshes cutting machine of the type, in which meshes are moved relative to the cooperating cutting edges of the machine.

2. Description of the Prior Art

It is known that difficulties are encountered with cutting of meshes when it is desired to move the meshes along a given parth, while cutting the same, because a great force unfavorably acts on the meshes themselves. To avoid such difficulties, a solution has been proposed, wherein the meshes are held stationary along the cutting length of meshes and the cutting means are moved. This however dictates the use of a large size cutting machine, because there is required a considerably long fixing or holding mechanism for meshes to be cut when a considerable cutting length is desired for the meshes as well as the use of cutting means adapted to move and cut the metal wire or bar members of meshes one after another.

The meshes are composed of a plurality of metal wires or bars extending both in the lengthwise direction and in the widthwise direction providing a flat sheet form.

The prior art cutting machine permits automatic cutting of meshes with such moving cutting edges, by setting meshes in such fixed position. The necessity of the use of fixing means necessarily leads to the provision of a cutting machine, whose size accommodates the cutting length desired. In practical application, such cutting length of meshes would have to be subjected to a certain limitation from the viewpoints of economy of the cutting machine and efficiency of operations.

As a result, it remains desired to have a cutting machine of the type, in which meshes to be cut are moved rather than the cutting edges. However, this approach involves many problems to be solved to attain the intended objects. One difficulty is to positively maintain the meshes within a given path, along which the meshes are being transferred or moved, because a considerable great force unfavorably exerts on the metal wires or bars composing the meshes, when cut. Another difficulty is that, even when various sizes of metal wires or bars are to be cut, successful cutting should result by positively maintaining the meshes composed of such various sizes of metal wires or bars along a given path. To this end, there would be required a cutting mechanism which has structures for driving and holding firm to the metal wires or bars which are being cut.

Accordingly, many problems are to be solved in the practical use of a meshes cutting machine of the aforesaid type.

SUMMARY OF THE INVENTION

It is accordingly an object of the invention to provide a meshes cutting machine, in which meshes are positively guided along a given path or in parallel with a cutting line, regardless of various diameters of metal wires or bars composing the meshes and the various clearances defined between the metal wires or bars.

It is a further object of the invention to provide a meshes cutting machine of a compact size, which permits continuous shifting, or guiding and cutting of the meshes along a given path and cutting regardless of sizes of the meshes.

It is a still further object of the invention to provide a meshes cutting machine in which, once charged, the meshes are automatically transferred and cut along a given path in a given direction.

According to the present invention, there is provided a meshes cutting machine which comprises a guide groove defined in the extension line of the cutting line of the meshes and a drive pawl mechanism for a lengthwise member extending in the advancing direction of the meshes, which mechanism is located on the open side of the guide groove and adapted to drive the lengthwise members of meshes in parallel with the guide groove. More particularly, according to the meshes cutting machine of the present invention, the upper edge member of the guide groove is used as an upper cutting edge which is stationary, while a lower cutting edge is so designed as to move in the vertical direction as well as in the advancing direction of the meshes; the drive pawl mechanism is so designed as to shift in a direction perpendicular to the advancing direction of the meshes and is provided with drive pawls having slits in their centers to receive a lengthwise member therein, the pawls being adapted to effect a rocking movement; and a holding cover is located above slits in the pawls.

BRIEF DESCRIPTION OF THE DRAWINGS

Various other objects, features and attendant advantages of the present invention will be more fully appreciated as the same becomes better understood from the following detailed description when considered in conjunction with the accompanying drawings, in which like reference characters designate like or corresponding parts throughout the several views, and wherein.

DETAILED DESCRIPTION OF THE PREFERRED EMBODIMENT

Figure 1:
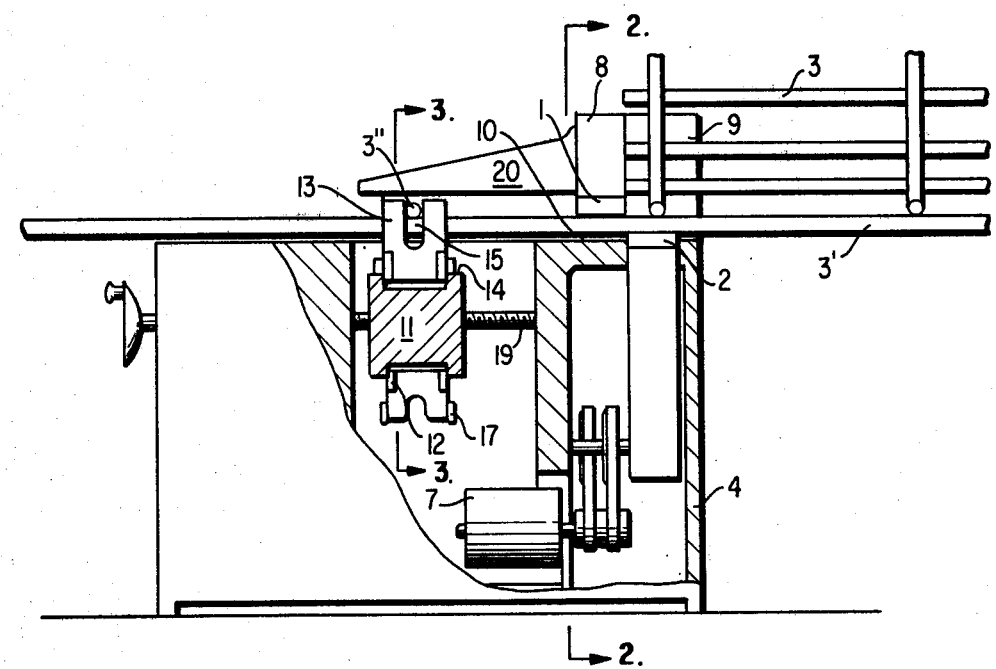
FIG. 1 is a side view, partially in cross-section, of one embodiment of the present invention.
Figure 2:
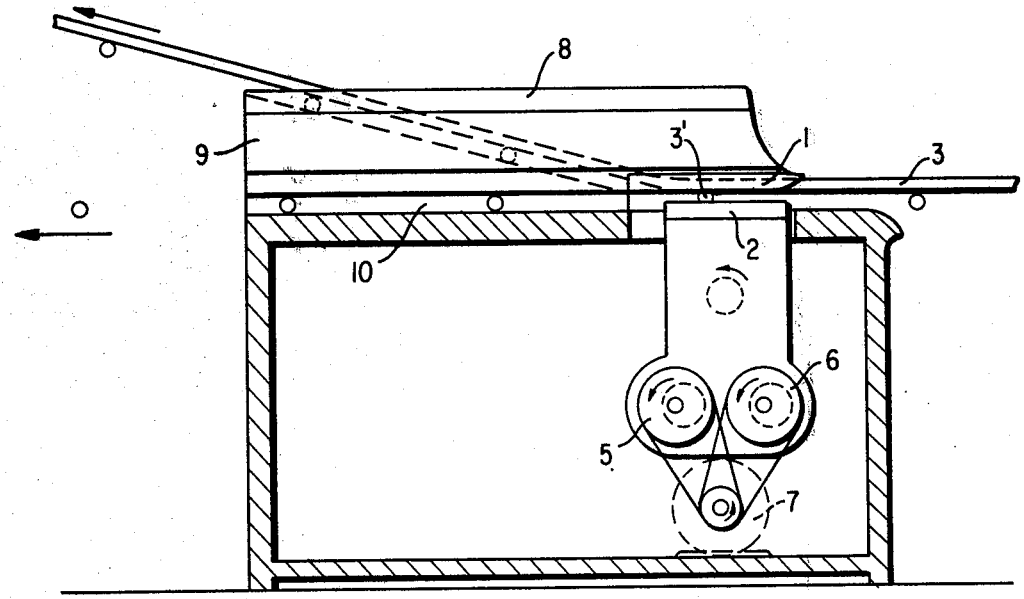
FIG. 2 is a cross-sectional view taken along the line A—A of FIG. 1.

Referring to FIGS. 1 and 2, a pair of cooperating shearing edges 1 and 2 are arranged in a manner to shear the widthwise members of meshes 3. The upper shearing edge or shear 1 is fixedly mounted on a body 4 of a machine, while the lower shearing edge or shear is adapted to move. The lower shearing edge 2 is driven by way of two eccentric drive shafts 5 and 6 by means of a motor 7 in a manner to effect vertical movement as well as the movement in the advancing direction of the meshes 3, while the widthwise member 3' is being sheared. The upper shearing edge 1 is affixed to a supporting member 8 which in turn is fixedly mounted through the medium of a triangular member 9 on the body 4. A guide groove is defined by three surfaces, i.e., the undersurface of the supporting member 8, a surface of the supporting member 8 which extends from the shearing surface of the upper shearing edge in the advancing direction of the meshes, and the top surface of the body 4. The triangular member 9 is formed with a sloped surface which is continuous with the top edge of the lower shearing edge 2. After the width wise members 3' of the meshes have been cut by means of the aforesaid pair of cooperating shearing edges 1 and 2, the meshes 3 are transferred along the upper surface of the triangular member 9, while the remaining part thereof is transferred along the guide groove 10.

A drive pawl mechanism 11 for the lengthwise members is provided in parallel with the shearing line of the meshes or shearing edges but on the open side of the guide groove 10.

Figure 3:
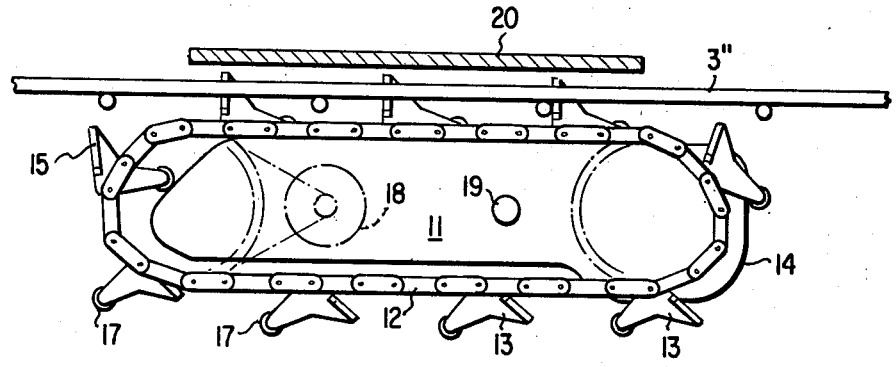
FIG. 3 is a cross-sectional view taken along the line B—B of FIG. 1.

As shown in FIG. 3, the drive pawl mechanism 11 is provided with a cam 14 which is located in one of the turn-over portions of an endless drive chain 12 and adapted to change inclined angles of pawls 13 by means of the cam surface thereof. The pawls are so designed as to permit their rocking motions relative to the endless chain 12. The pawl 13 is formed with a slit 15 in its central portion, and thus a member 3" extending in an advancing direction of the meshes will fit the slit 15, such that the front face of the pawl 13 will urge the widthwise member 3' forward to thereby drive the same. In case the pawl 13 is pushed from the rear, then the pawl 13 will be free to rock so as not to hinder the advancing movement of the widthwise member 3'. Accordingly, the pitch of the pawls 13 should not necessarily be in coincidence with that of the widthwise members 3', but at least one pawl 13 should urge the widthwise member 3' of the meshes 3 for smoothly transferring the same.

Figure 4:
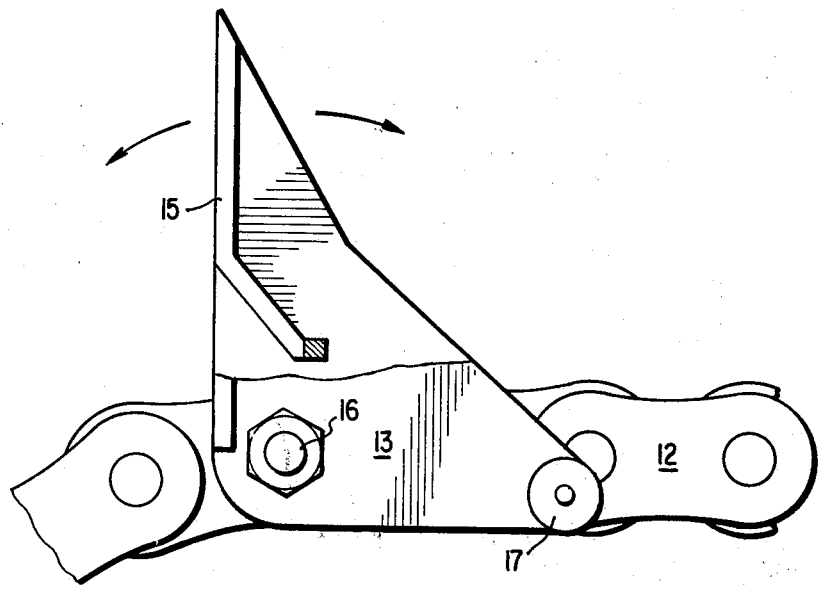
FIG. 4 is an enlarged side view of a pawl.

More particularly, as shown in FIG. 4, the pawl 13 is pivotted to the chain 12 by means of a shaft 16 and hence is free to rock about the shaft 16. The pawls 13 are each provided with rollers 17. Thus, the contact of roller 17 with cam 14 restricts rotation of the pawl 13 with respect to one direction, whereby the pawls 13 drive the meshes 3. As can be seen from FIG. 3, the configuration of cam 14 may be prepared so as to match the speed of a pawl 13 with the speed of the meshes being transferred, even along the turn-over portion of the chain 12. The chain 12 is driven by a motor 18 mounted on the drive pawl mechanism 11 which is in turn mounted on a screw member 19 affixed to the body 4, whereby the mechanism 11 may be spaced a desired distance from the body 4, while maintaining parallelism with the shearing edges. Located above the slits 15 of the pawls 13 is a holding cover 20 which is secured to the supporting member 8.

In operation, before shearing the meshes 3, the drive pawl mechanism 11 is moved by means of the screw member 19 to set the distance the mechanism 11 is to be spaced from the shearing line and thereby to locate the lengthwise member 3" of the meshes 3 in a desired position relative to the shearing edges. With the motors 7 and 8 in operation, and with one of lengthwise members 3" being fitted in the slit 15 of the pawl 13, the adjustment is made such that the front face of one of the pawls 13 will abut one of the widthwise members 3' of the meshes 3 to drive the same. This permits automatic guiding of the meshes and automatic shearing.

After the widthwise members 3' of the meshes 3 have been sheared by means of shearing edges 1 and 2, the portion of the meshes 3 which is being guided by the guide groove 3 is restricted against the movement of directions other than the advancing direction of the meshes 3, in a horizontal plane, with the aid of slits 15 of the drive pawl mechanism 11, which slits 15 hold the lengthwise members 3", i.e., the member extending in an advancing direction thereof. The positive, parallel movement of the lengthwise members 3" with the shearing line is maintained not only by the slit 15 holding the lengthwise member 3" therein but also by the widthwise members 3' of the meshes which are moving along the guide groove 10. This insures positive and accurate transfer of the meshes being sheared, even if a considerably great force is exerted on the meshes 3 at the time of shearing. In addition, the vertical movement of the widthwise members 3' of the meshes 3 is restricted by means of the guide groove 10. As a result, even if the configurations of the guide groove 10 and slit 15 do not accommodate the diameter of the wires composing the meshes 3, positive, parallel transfer of the meshes 3 may be maintained. This is further supplemented by the provision of the holding cover 20. Meanwhile, the lower shearing edge 2 may move in the advancing direction of the meshes 3 in addition to the vertical movement, such that the meshes 3 will be sheared, while being transferred, thereby allowing continuous transfer and shearing operations.

As is apparent from the foregoing, the movements of the meshes in directions other than the advancing direction of the meshes in a horizontal plane as well as the vertical movement of the meshes on the cutting edges, preferably shearing edges, may be completely restricted by means of guide groove and drive pawls, even after the meshes have been cut. Accordingly, even if a considerable great force acts on the meshes, when cut during the movement of the meshes in an advancing direction, the meshes may be guided positively and cut along the predetermined cutting line thereof. It should be appreciated that the meshes may be moved continuously during the cutting operation and hence there is imposed no limitation on the cutting length of the meshes. This further dispenses with supporting or fixing means which should accommodate the size of the meshes, thus presenting a cutting machine of compact size. In addition, the provision of the lower cutting edge which may move in a vertical direction as well as in the advancing direction of the meshes, when cut, permits the cutting of the meshes which are continuously moving. Furthermore, since the drive pawls may rock relative to a drive chain, at least one of the pawls may engage or abut one or more of the widthwise members to drive the same, even if the pitch of the pawls does not coincide with that of the meshes, the remaining pawls presenting no interference with the advancement or entrance of the meshes to a cutting position. Furthermore, the speed of the drive pawls which are about to engage the meshes may be maintained so as to match the advancing speed of the meshes which are driven by the drive pawls.

It is to be understood that variations and modifications may be made without departing from the scope of the invention; and that the disclosure herein is to be taken as being illustrative of the invention and not in limitation thereof.

What is claimed as new and desired to be secured by Letters Patent of the United States is:

1. A meshes cutting machine provided with a pair of cooperating cutting edges for cutting meshes consisting of wire members, and with a mechanism for moving said meshes, comprising:
   a guide groove extending along the extension line of the cutting line of said meshes in the advancing direction of said meshes; and
   a drive pawl mechanism located on the open side of said guide groove and adapted to shift the lengthwise members of said meshes in parallel with said guide groove.

2. A meshes cutting machine as set forth in claim 1, wherein one of said pair of cooperating cutting edges moves in the advancing direction of said meshes in addition to the vertical movement thereof.

3. A meshes cutting machine as set forth in claim 1, wherein the distance of said drive pawl mechanism from said guide groove may be varied.

4. A meshes cutting machine as set forth in claim 1, wherein said drive pawl mechanism is provided with pawls having slits in the center portions thereof.

5. A meshes cutting machine as set forth in claim 4, wherein a meshes holding cover is provided above said slits.

6. A meshes cutting machine as set forth in claim 1, wherein said drive pawl mechanism is provided with pawls which effect a rocking motion relative to an endless chain.

7. A meshes cutting machine as set forth in claim 6, wherein the inclined angles of said pawls which effect a rocking motion, may be varied by means of a cam.

8. A meshes cutting machine as set forth in claim 1, wherein the pair of cooperating cutting edges for cutting said meshes consists of a pair of shearing edges.

* * * * *